(12) United States Patent
Ashbrook (10) Patent No.: US 10,019,221 B2
(45) Date of Patent: Jul. 10, 2018

(54) METHOD AND APPARATUS FOR CONCURRENTLY PRESENTING DIFFERENT REPRESENTATIONS OF THE SAME INFORMATION ON MULTIPLE DISPLAYS

(75) Inventor: Daniel L. Ashbrook, Sunnyvale, CA (US)

(73) Assignee: Nokia Technologies Oy, Espoo (FI)

(*) Notice: Subject to any disclaimer, the term of this patent is extended or adjusted under 35 U.S.C. 154(b) by 475 days.

(21) Appl. No.: 13/472,941

(22) Filed: May 16, 2012

(65) Prior Publication Data
US 2013/0307870 A1 Nov. 21, 2013

(51) Int. Cl.
| | |
|---|---|
| H04N 1/387 | (2006.01) |
| H04N 7/16 | (2011.01) |
| G06T 1/00 | (2006.01) |
| G06T 19/00 | (2011.01) |
| G06F 3/147 | (2006.01) |
| G06F 21/84 | (2013.01) |

(52) U.S. Cl.
CPC .............. *G06F 3/147* (2013.01); *G06F 21/84* (2013.01); *G06F 2221/032* (2013.01); *G06T 1/0028* (2013.01); *G06T 19/006* (2013.01); *G09G 2340/10* (2013.01); *G09G 2358/00* (2013.01); *H04N 1/3872* (2013.01); *H04N 7/166* (2013.01)

(58) Field of Classification Search
CPC ................ H04N 1/3872; H04N 7/166; G06T 2201/005; G06T 1/0028; G06T 19/006; G09G 2340/10
USPC .......................... 345/629–633; 380/205–209; 382/282–283
See application file for complete search history.

(56) References Cited

U.S. PATENT DOCUMENTS

| | | | |
|---|---|---|---|
| 5,969,753 A * | 10/1999 | Robinson | ...................... 348/130 |
| 6,597,328 B1 | 7/2003 | Stern et al. | |
| 7,253,791 B2 | 8/2007 | Kahan et al. | |
| 7,479,967 B2 | 1/2009 | Bachelder et al. | |

(Continued)

FOREIGN PATENT DOCUMENTS

| | | |
|---|---|---|
| CN | 101243392 A | 8/2008 |
| CN | 201156126 Y | 11/2008 |

(Continued)

OTHER PUBLICATIONS

Office Action for corresponding Chinese Application No. 201310181928.X dated Sep. 14, 2015.

*Primary Examiner* — Matthew Salvucci
(74) *Attorney, Agent, or Firm* — Alston & Bird LLP (57) ABSTRACT

A method, apparatus, and computer program product are provided in order to present different types of information, such as private information and public information, in a manner that preserves the confidentiality of the private information. In the context of a method, a determination is made as to whether information that is to be displayed is private. If the information is private, the method may cause the presentation of an obscured representation of the information on a non-private display. The method also causes the presentation of the information, such as an unobscured representation of the information, on a private pass-through display concurrent with the presentation of the obscured representation of the information on the non-private display. A corresponding apparatus and computer program product are also provided.

20 Claims, 7 Drawing Sheets

(56) References Cited

U.S. PATENT DOCUMENTS

| | | | |
|---|---|---|---|
| 8,115,698 B2* | 2/2012 | Azor et al. .................... | 345/1.1 |
| 8,191,152 B1* | 5/2012 | Barker .................. | G06Q 40/00 |
| | | | 704/244 |
| 2003/0133569 A1 | 7/2003 | Stem et al. | |
| 2010/0164990 A1 | 7/2010 | Van Doorn | |
| 2011/0090233 A1* | 4/2011 | Shahraray et al. ........... | 345/520 |
| 2011/0321143 A1 | 12/2011 | Angaluri et al. | |
| 2012/0131471 A1* | 5/2012 | Terlouw ............. | G06F 3/04883 |
| | | | 715/741 |
| 2012/0242695 A1* | 9/2012 | Martin ......................... | 345/633 |

FOREIGN PATENT DOCUMENTS

| | | |
|---|---|---|
| EP | 1 607 843 A2 | 12/2005 |
| JP | 2009-093008 A | 4/2009 |
| WO | WO 2004/066620 A1 | 8/2004 |

\* cited by examiner

METHOD AND APPARATUS FOR CONCURRENTLY PRESENTING DIFFERENT REPRESENTATIONS OF THE SAME INFORMATION ON MULTIPLE DISPLAYS

TECHNOLOGICAL FIELD

An example embodiment relates generally to the presentation of information on a display and, more particularly, to the presentation of different representations of the same information on different types of displays.

BACKGROUND

A wide variety of information is presented upon the displays of various computing devices. It may be appropriate for some of the information that is presented to be viewed by any person in the vicinity of the display. However, it may be impermissible or at least undesirable for other types of information, e.g., private information, to be viewed by anyone other than the user of the computing device or those granted permission by the user. In this situation, the user may not wish for other people to be able to view the private information that is presented upon a display of the user's computing device. There may be various types of private information that is presented upon the display of a computing device. In one example, an employee may receive documents, email messages, text messages or the like of a personal nature and may present the private information upon the display of the user's computing device while at work. However, the employee may not wish for other employees to view the personal information.

In order to limit the manner in which private information may be viewed while presented upon the display of a computing device, a physical privacy shield may be mounted upon the display. While a physical privacy shield may reduce the viewing angle at which the information that is presented upon the display of the computing device may be viewed, the physical privacy shield does not eliminate the possibility that the private information presented upon the display of the computing device may be viewed by another person. Alternatively, the window in which the private information is presented upon the display of the computing device may be shrunk or may be hid when another person approaches the display of the computing device. However, shrinking or hiding of the window in which the private information is presented is not only dependent upon the vigilance of the user who must be aware of the approach of another person, but also makes it more challenging for the user to view the private information, at least in any continuous manner.

Still further, a user may protect the private information from disclosure to other people by causing all of the information, both private information and public information, to be presented upon a display of the computing device that is private to the user. While the presentation of the information upon a private display may protect the confidentiality of the private information, the presentation of the public information upon the private display will prevent the user from sharing the public information with others, at least in a routine manner and, in any event, may make the use of the public information more complex. Further, the presentation of all types of information, both private and public information, upon a private display may create social issues for the user in that other people, such as co-workers, roommates or the like, may view such behavior as suspicious, rude, or otherwise unusual. Privacy concerns may also arise in the use of multiple simultaneous displays. In this regard, two or more people may be playing a video game or otherwise interacting via a window of the multiple simultaneous displays, which they would like to remain private.

BRIEF SUMMARY

A method, apparatus, and computer program product are provided according to an example embodiment of the present invention in order to present different types of information, such as private information and public information, in a manner that preserves the confidentiality of the private information. In this regard, the method, apparatus and computer program product of an example embodiment may present different representations of information, such as private information, on a non-private display and on a private pass-through display. Thus, the method, apparatus and computer program product of an example embodiment may preserve the confidentiality of the information by obscuring the representation of the information on the non-private display, while permitting the user to view an unobscured representation of the information on the private pass-through display. In addition to the obscured representation of the information, the method, apparatus and computer program product of an example embodiment may provide for the presentation of other information, such as public information, in an unobscured manner on the non-private display, thereby allowing a user to share this other information, such as public information, with others.

In one embodiment, a method is provided that includes determining that information to be displayed is private and causing presentation of an obscured representation of the information on a non-private display. The method of this embodiment also causes presentation of the information on a private pass-through display concurrent with the presentation of the obscured representation of the information on the non-private display. In one embodiment, the presentation of the information on the private pass-through display may include positioning the information on the private pass-through display such that the information obscures a view by a user of the obscured representation of the information on the non-private display.

In one embodiment, the method may cause presentation of the information on the private pass-through display by positioning the information on the private pass-through display based upon a fiducial marker associated with the non-private display such that the presentation of the information on the private pass-through display overlies the obscured representation of the information on the non-private display.

In one embodiment, the method may cause presentation of the obscured representation of the information on the non-private display by causing presentation of an unobscured representation of a non-private portion of the information and concurrently causing presentation of the obscured representation of a private portion of the information. In another embodiment, the method may cause presentation of the obscured representation of the information on the non-private display by causing presentation of the obscured representation of both a private portion and a non-private portion of the information. In a further embodiment, the method may cause presentation of the obscured representation of the information on the non-private display by causing presentation of different information on the non-private display instead of the information determined to be private.

In another embodiment, an apparatus is provided that includes at least one processor and at least one memory including computer program instructions with the at least one memory and the computer program instructions configured to, with the at least one processor, cause the apparatus at least to determine that information to be displayed is private and cause presentation of an obscured representation of the information on a non-private display. The at least one memory and the computer program instructions are also configured to, with the at least one processor, cause the apparatus of this embodiment to cause presentation of the information on a private pass-through display, such as a head-mounted or near-eye display, concurrent with the presentation of the obscured representation of the information on the non-private display. In one embodiment, the at least one memory and the computer program instructions may also be configured to, with the at least one processor, cause the apparatus to present the information on the private pass-through display by positioning the information on the private pass-through display such that the information obscures a view by a user of the obscured representation of the information on the non-private display.

In one embodiment, the at least one memory and the computer program instructions may be configured to, with the at least one processor, cause the apparatus to cause presentation of the information on the private pass-through display by positioning the information on the private pass-through display based upon a fiducial marker associated with the non-private display such that the presentation of the information on the private pass-through display overlies the obscured representation of the information on the non-private display.

In one embodiment, the at least one memory and the computer program instructions may be configured to, with the at least one processor, cause the apparatus to cause presentation of the obscured representation of the information on the non-private display by causing presentation of an unobscured representation of a non-private portion of the information and concurrently causing presentation of the obscured representation of a private portion of the information. In another embodiment, the at least one memory and the computer program instructions may be configured to, with the at least one processor, cause the apparatus to cause presentation of the obscured representation of the information on the non-private display by causing presentation of the obscured representation of both a private portion and a non-private portion of the information. In a further embodiment, the at least one memory and the computer program instructions may be configured to, with the at least one processor, cause the apparatus to cause presentation of the obscured representation of the information on the non-private display by causing presentation of different information on the non-private display instead of the information determined to be private.

In a further embodiment, a computer program product is provided that includes at least one non-transitory computer-readable storage medium bearing computer program instructions embodied therein for use with a computer with the computer program instructions including instructions that are configured to determine that information to be displayed is private and to cause presentation of an obscured representation of the information on a non-private display. The computer program instructions of this embodiment also include instructions configured to cause presentation of the information on a private pass-through display concurrent with the presentation of the obscured representation of the information on the non-private display. In one embodiment, the instructions configured to cause the presentation of the information on the private pass-through display may include instructions configured to position the information on the private pass-through display such that the information obscures a view by a user of the obscured representation of the information on the non-private display.

In one embodiment, the instructions configured to cause presentation of the information on the private pass-through display include instructions configured to position the information on the private pass-through display based upon a fiducial marker associated with the non-private display such that the presentation of the information on the private pass-through display overlies the obscured representation of the information on the non-private display.

In one embodiment, the instructions configured to cause presentation of the obscured representation of the information on the non-private display include instructions configured to cause presentation of an unobscured representation of a non-private portion of the information and to concurrently cause presentation of the obscured representation of a private portion of the information. In another embodiment, the instructions configured to cause presentation of the obscured representation of the information on the non-private display include instructions configured to cause presentation of the obscured representation of both a private portion and a non-private portion of the information. In a further embodiment, the instructions configured to cause presentation of the obscured representation of the information on the non-private display include instructions configured to cause presentation of different information on the non-private display instead of the information determined to be private.

In yet another embodiment, an apparatus is provided that includes means for determining that information to be displayed is private and means for causing presentation of an obscured representation of the information on a non-private display. The apparatus of this embodiment also includes means for causing presentation of the information on a private pass-through display concurrent with the presentation of the obscured representation of the information on the non-private display. In one embodiment, the means for causing presentation of the information on the private pass-through display may include means for positioning the information on the private pass-through display such that the information obscures a view by a user of the obscured representation of the information on the non-private display.

DETAILED DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

In accordance with an example embodiment, a method, apparatus and computer program product are provided in order to permit representations of the same information to be presented on both a non-private display and a private pass-through display. In this manner, different representations of the same information may be presented so as to permit the confidentiality of private information to be protected, while still permitting other information, such as public information, to be presented upon the non-private display in a manner that may be shared with others so as not to arouse suspicion or otherwise create social issues for the user.

Figure 1:
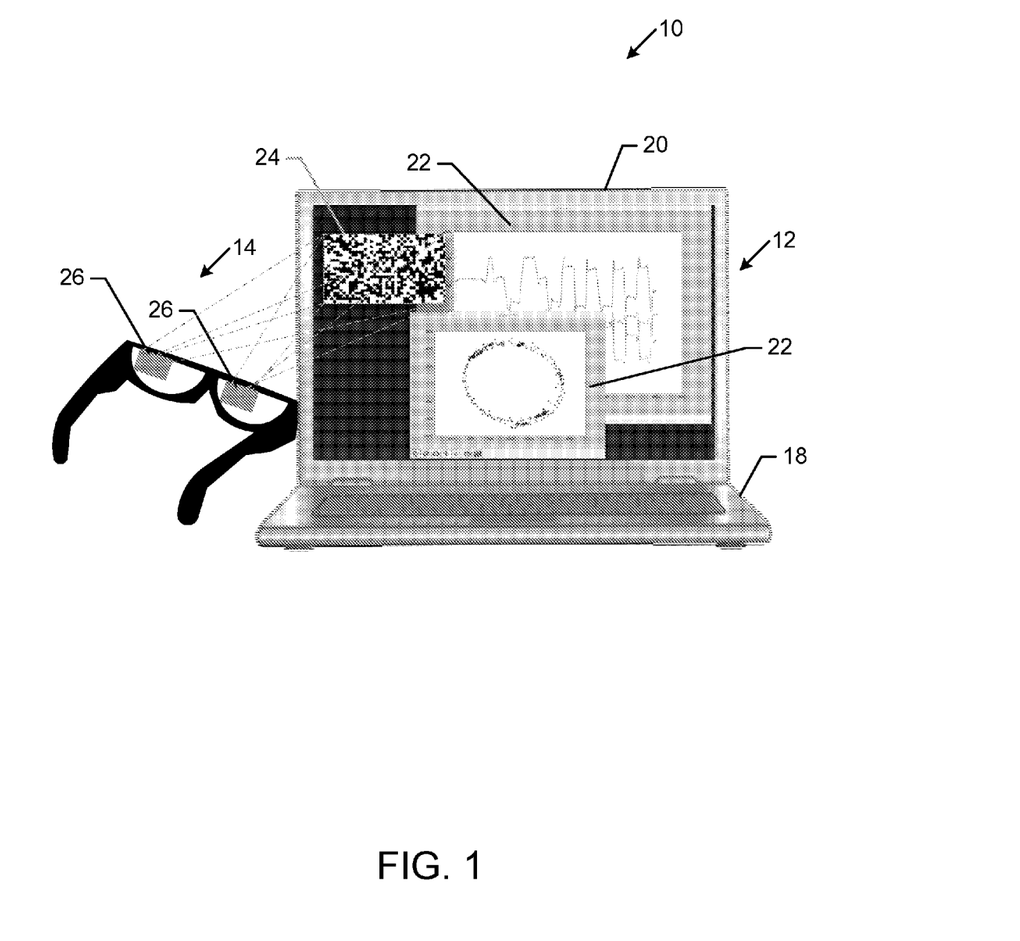
FIG. 1 is a schematic representation of a system including a non-private display and a private pass-through display that may be specifically configured in accordance with an example embodiment of the present invention.

Referring now to FIG. 1, a system 10 that includes both a non-private display 12 and a private pass-through display 14 is illustrated. A system 10 may include a wide variety of non-private displays 12 including, for example, the displays associated with various computing devices such as a desktop computer, a computer workstation, a laptop computer, a notebook computer, a tablet computer, a mobile telephone, a personal digital assistant or the like. Regardless of the type of non-private display 12, the non-private display may be located or otherwise operated in a manner that may be viewed, not only by the user of the respective computing device, but also by others, such as co-workers, roommates, or others in the vicinity. In this regard, the non-private display 12 may be a public display in that any member of the public in the vicinity of the display may view the display. However, the non-private display 12 need not be publicly viewable and, as such, need not be a public display, but may, instead, be only viewable by certain others in addition to the user of the respective computing device. For example, the display of a desktop computer or computer workstation at the user's place of business may not be a public display in that the public may not be able to readily access and view the display, but co-workers of the user may be able to view the display such that the display is a non-private display.

The private pass-through display 14 may also be configured in various manners. For example, the private pass-through display 14 may be a near-eye display, such as a head worn display, through which the user may optically view a scene external to the near-eye display. By way of example, a near-eye display of one embodiment is shown in FIG. 1 in the form of a pair of eyeglasses. The eyeglasses may be worn by user such that the user may view a scene, e.g., a field of view, through the lenses of the eyeglasses. However, the eyeglasses of this embodiment may also be configured to present a visual representation of information 26 upon the lenses so as to augment or supplement the user's view of the scene through the lenses of the eyeglasses. As such, the eyeglasses may support augmented reality and other applications. While an example of a private pass-through display 14 has been provided, the private pass-through display may be embodied in a number of different manners with a variety of form factors, each of which may permit a user to effectively see through the display, such as by seeing through the display either optically or via an image that is captured and presented upon the display, so as to view the user's surroundings and each of which of which may benefit from the method, apparatus and computer program product of an example embodiment of the present invention as described below.

Regardless of the type of private pass-through display 14, the private pass-through display is intended to be viewed only by the user or one or more others with whom the user specifically shares the private pass-through display, such as by allowing another person to wear the head-mounted or near-eye display. However, the private pass-through display 14 is not intended to be viewed by others to whom the user has not particularly provided the private pass-through display. Thus, information that is presented upon the private pass-through display 14 may remain private or confidential to the user.

The private pass-through display 14 is also associated with a computing device. While the computing device associated with the private pass-through display 14 may be configured in various manners, the computing device associated with the private pass-through display of one embodiment may be a mobile terminal, such as a mobile telephone, a personal digital assistant (PDA), a gaming device, a global positioning system (GPS) terminal, a tablet computer, a laptop computer or the lack. While different computing devices may be associated with the private pass-through display 14 and the non-private display 12, both the private pass-through display and the non-private display may be associated with the same computing device in some embodiments.

In addition to the non-private display 12 and the private pass-through display 14, the system 10 of an embodiment of the present invention may include an apparatus 30 as generally described below in conjunction with FIG. 2 for performing one or more of the operations set forth by FIG. 3 and also described below. In this regard, the apparatus 30 may be embodied by the computing device associated with the non-private display 12 and/or the computing device of the private pass-through display 14. In this embodiment, the computing devices associated with the non-private display 12 and the private pass-through display 14 may be in communication with one another, either directly, such as via a wireless or wireline connection, or indirectly via one or more intermediate computing devices. However, the apparatus 30 may alternatively be embodied by another computing device that is in communication with and is configured to at least partially control the presentation of information upon the non-private display and the private pass-through display. In this regard, apparatus 30 is in communication with the computing device of the non-private display 12 and the computing device of the private pass-through display 14, such as via a wireless connection, a wireline connection or the like.

Figure 2:
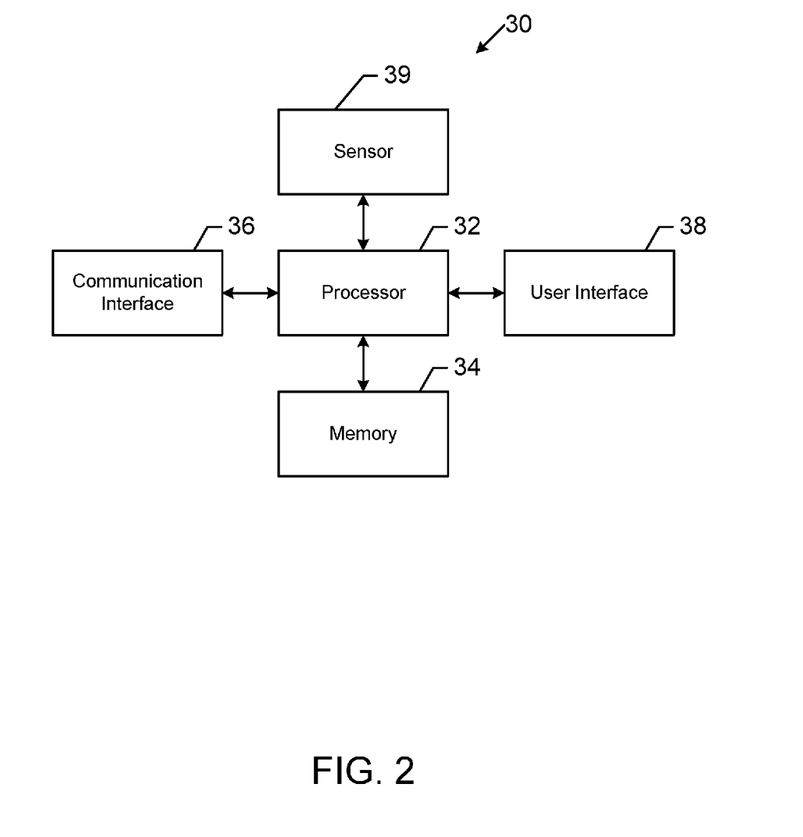
FIG. 2 is a block diagram of an apparatus that may be specifically configured in accordance with an example embodiment of the present invention.

It should also be noted that while FIG. 2 illustrates one example of a configuration of an apparatus 30 for controlling the presentation of information upon a non-private display 12 and a private pass-through display 14, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 2, the apparatus 30 for controlling the presentation of information upon a non-private display 12 and a private pass-through display 14 in accordance with one example embodiment may include or otherwise be in communication with a processor 32, a memory 34, a communication interface 36, a user interface 38 and a sensor 39. In some embodiments, the processor 32 (and/or co-processors or any other processing circuitry assisting or otherwise associated with the processor) may be in communication with the memory device 34 via a bus for passing information among components of the apparatus 30. The memory device 34 may include, for example, one or more volatile and/or non-volatile memories. In other words, for example, the memory device 34 may be an electronic storage device (e.g., a computer readable storage medium) comprising gates configured to store data (e.g., bits) that may be retrievable by a machine (e.g., a computing device like the processor 32). The memory device 34 may be configured to store information, data, content, applications, instructions, or the like for enabling the apparatus 30 to carry out various functions in accordance with an example embodiment of the present invention. For example, the memory device 34 could be configured to buffer input data for processing by the processor 30. Additionally or alternatively, the memory device 34 could be configured to store instructions for execution by the processor 32.

In some embodiments, the apparatus 30 may be embodied as a chip or chip set. In other words, the apparatus 30 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 30 may therefore, in some cases, be configured to implement an embodiment of the present invention on a single chip or as a single "system on a chip." As such, in some cases, a chip or chipset may constitute means for performing one or more operations for providing the functionalities described herein.

The processor 32 may be embodied in a number of different ways. For example, the processor 32 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 32 may include one or more processing cores configured to perform independently. A multi-core processor may enable multiprocessing within a single physical package. Additionally or alternatively, the processor 32 may include one or more processors configured in tandem via the bus to enable independent execution of instructions, pipelining and/or multithreading.

In an example embodiment, the processor 32 may be configured to execute instructions stored in the memory device 34 or otherwise accessible to the processor. Alternatively or additionally, the processor 32 may be configured to execute hard coded functionality. As such, whether configured by hardware or software methods, or by a combination thereof, the processor 32 may represent an entity (e.g., physically embodied in circuitry) capable of performing operations according to an embodiment of the present invention while configured accordingly. Thus, for example, when the processor 32 is embodied as an ASIC, FPGA or the like, the processor may be specifically configured hardware for conducting the operations described herein. Alternatively, as another example, when the processor 32 is embodied as an executor of software instructions, the instructions may specifically configure the processor to perform the algorithms and/or operations described herein when the instructions are executed. However, in some cases, the processor 32 may be a processor of a specific device configured to employ an embodiment of the present invention by further configuration of the processor by instructions for performing the algorithms and/or operations described herein. The processor 32 may include, among other things, a clock, an arithmetic logic unit (ALU) and logic gates configured to support operation of the processor.

Meanwhile, the communication interface 36 may be any means such as a device or circuitry embodied in either hardware or a combination of hardware and software that is configured to receive and/or transmit data from/to a network and/or any other device or module in communication with the apparatus 30, such as by supporting communications with the computing device(s) associated with the non-private display 12 and the private pass-through display 14. In this regard, the communication interface 36 may include, for example, an antenna (or multiple antennas) and supporting hardware and/or software for enabling communications with a wireless communication network. Additionally or alternatively, the communication interface 36 may include the circuitry for interacting with the antenna(s) to cause transmission of signals via the antenna(s) or to handle receipt of signals received via the antenna(s). In some environments, the communication interface 36 may alternatively or also support wired communication. As such, for example, the communication interface 36 may include a communication modem and/or other hardware/software for supporting communication via cable, digital subscriber line (DSL), universal serial bus (USB) or other mechanisms The apparatus 30 may include a user interface 38 that may, in turn, be in communication with the processor 32 to provide output to the user and, in some embodiments, to receive an indication of a user input. As such, the user interface 38 may include a display and, in some embodiments, may also include a keyboard, a mouse, a joystick, a touch screen, touch areas, soft keys, a microphone, a speaker, or other input/output mechanisms. In one embodiment, the display of the apparatus 30 may be embodied by the non-private display 12 and the private pass-through display 14. For example, in an instance in which the private pass-through display 14 is embodied as a pair of eyeglasses, one or both of the lenses of the eyeglasses may serve as the display upon which a representation of information is presented. The processor 32 may comprise user interface circuitry configured to control at least some functions of one or more user interface elements such as a display and, in some embodiments, a speaker, ringer, microphone and/or the like. The processor 32 and/or user interface circuitry comprising the processor may be configured to control one or more functions of one or more user interface elements through computer program instructions (e.g., software and/or firmware) stored on a memory accessible to the processor (e.g., memory 34, and/or the like).

As shown in FIG. 2, the sensor 39, such as a gaze tracker, may be in communication with the processor 32 and may be configured detect changes in movement or behavior of a user's eyes. In some embodiments, the sensor 39 may be configured to track a user's gaze, such as by detecting the location and/or focus point of the user's eyes. For example, the sensor 39 may be configured to transmit a beam or other signal, e.g., infrared light, that reflects or is otherwise returned from the user's eyes. The sensor 39 may also be configured to receive the beam or other signal upon its return. Additionally or alternatively, the sensor 39 may use other functionality, e.g., pictures and/or video taken with a camera, to track the user's gaze. Along these same lines, the sensor 39 may be configured to detect the size of a user's pupil in order to determine the user's focus point in a three-dimensional environment, e.g., depth of the user's focus point. In some embodiments, the sensor 39 may provide output, e.g., signals, beams, pictures, videos, etc., to the processor 32 to enable the processor to determine various parameters regarding the user's gaze, e.g., location, focus point, etc.

The method, apparatus 30 and computer program product may now be described in conjunction with the operations illustrated in FIG. 3. In this regard, the apparatus 30 and, more particularly, the processor 32, may determine that the information that is to be displayed is private. See block 40 of FIG. 3. This determination as to whether information that is to be displayed is private may be made in various manners. For example, the information may be marked as private, public or of another type. For example, the user or a third party may mark the information as being private, public or of another type. While the information may be marked in various manners, the information of one embodiment may include or be associated with a flag, metadata or the like that includes an indication as to whether the information is private, public or of another type. Still further, the apparatus 30, such as a processor 32, of one embodiment may determine that the information to be displayed is private based on the source of the information. In this regard, information that is provided by certain sources, such as individuals identified as family and friends in the user's contacts database, may be identified to be private, while information provided by other sources may be identified to be public or otherwise non-private. Still further, the apparatus 30, such as a processor 32, may identify information that is provided by one or more predefined applications or types of applications to be private. In this regard, the apparatus 30, such as the processor 32, may identify information that is provided by or otherwise associated with a banking application to be private, while information provided by or otherwise associated with other applications may be considered public or otherwise non-private. While several examples of the manner in which the apparatus 30, such a processor 32, may determine that information that is to be displayed is private have been provided, the apparatus, such the processor, may be configured to determine that information to be displayed is private in other manners. As such, the apparatus 30 may include means, such the processor 32 or the like, for determining that information to be displayed is private.

Figure 3:
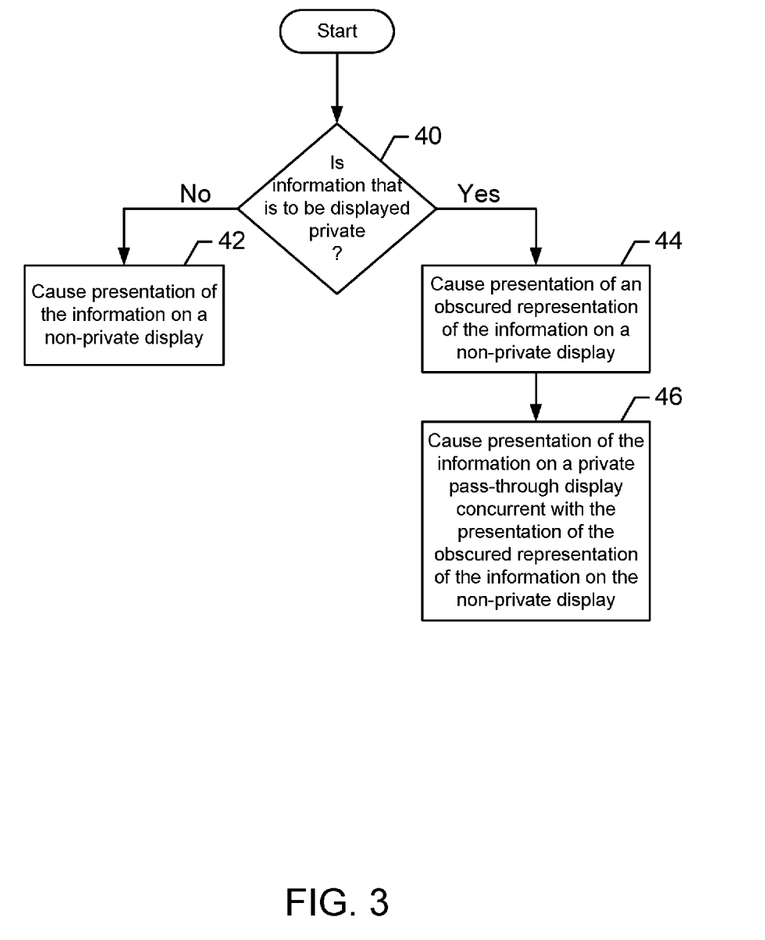
FIG. 3 is a flow chart illustrating operations performed in accordance with an example embodiment of the present invention.

Referring now to block 42 of FIG. 3, in an instance in which the information is not determined to be private, the apparatus 30, such as the processor 32, the user interface 38, the communication interface 36 or the like, may cause the presentation of an unobscured representation of the information that is determined to be public or otherwise non-private on the non-private display 12. For example, an unobscured representation of non-private information is presented in windows 22 of the non-private display 12 of FIG. 1. Thus, the apparatus 30 of one embodiment may include means, such the processor 32, the user interface 38, the communication interface 36 or the like, for causing the presentation of an unobscured representation of the information that is determined to be non-private on the non-private display 12.

Figure 4:
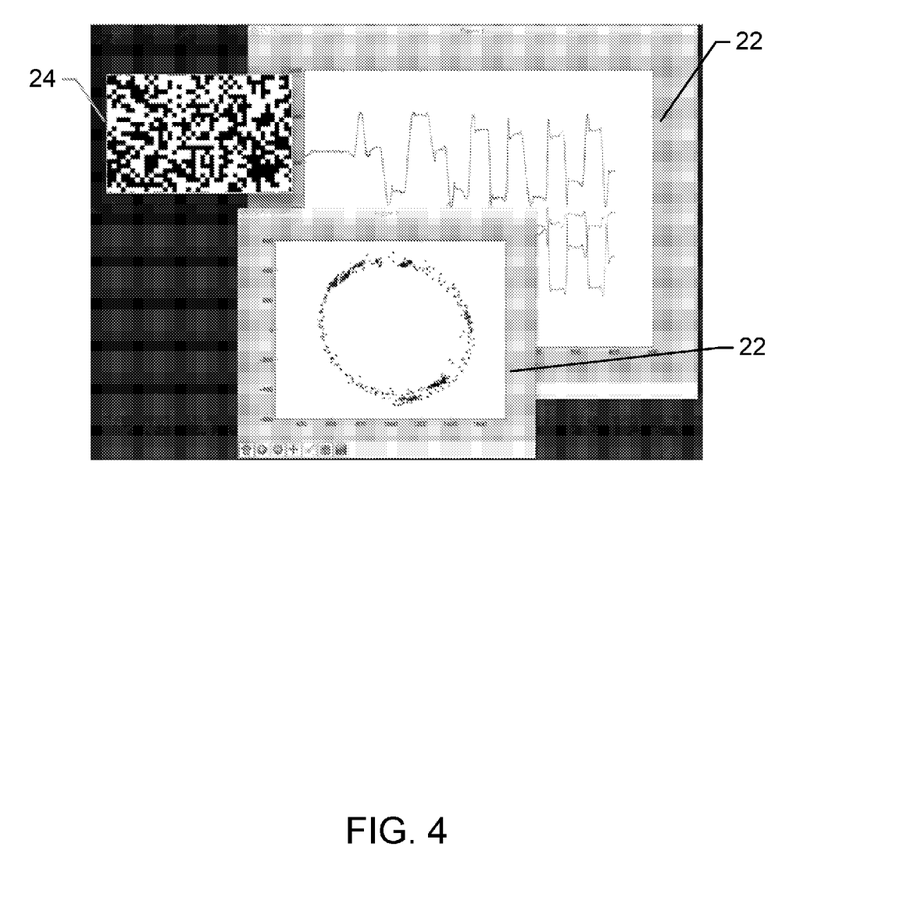
FIG. 4 is an illustration of an obscured representation of some information and an unobscured representation of other information on a non-private display in accordance with one embodiment of the present invention.

However, as shown in block 44 of FIG. 3, in an instance in which the information is determined to be private, the apparatus 30, such as the processor 32, the user interface 38, the communication interface 36 or the like, may cause the presentation of an obscured representation of the information on the non-private display 12. The obscured representation of the information may be presented in various manners. As a result of the obscuring, the information will not be legible, at least not completely. As shown in FIG. 4, a window 24 within which the private information would otherwise have been presented may be displayed, but the image presented within the window may be an obscured representation of the information, as opposed to the information itself. In the embodiment of FIG. 4, the obscured representation within window 24 is a fiducial marker, such as a registration mark, that indicates to the user that private information would have otherwise been presented within the window, but does not otherwise disclose the private information, thereby protecting its confidentiality.

The non-private display 12 may be configured such that only one window is presented at a time such that only the obscured representation of the information is presented. However, the non-private display 12 may be configured as shown in FIGS. 1 and 4 so as to present multiple windows within which different types of information, e.g., private information, public information, etc., may be concurrently presented. In this regard, the apparatus 30, such as the processor 32, the user interface 38, the communication interface 36 or the like, may be configured to cause the presentation of an unobscured representation of non-private information, such as public information, in one or more windows 22 or other portions of the non-private display 12 concurrent with the presentation of an obscured representation of the private information, such as within window 24. As such, the user may share the presentation of the non-private information with others, such as co-workers or the like, in a conventional manner while continuing to protect the confidentiality of the private information for which an obscured representation is presented as shown in FIGS. 1 and 4.

Figure 5:
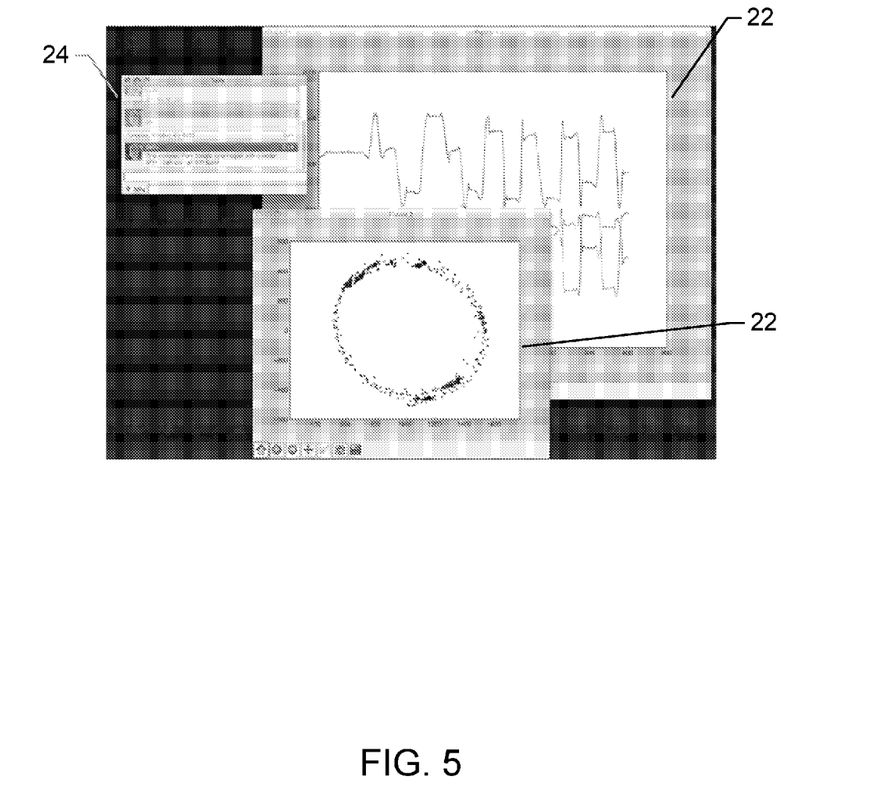
FIG. 5 is an illustration of an obscured representation of some information and an unobscured representation of other information on a non-private display in accordance with another embodiment of the present invention.

The obscured representation of the private information may be presented in other manners. For example, FIG. 5 illustrates a non-private display 12 of one embodiment in which a text message from Sally that is considered to be private information is obscured. In contrast to the registration mark that is caused to be presented instead of the private information in the embodiment of FIG. 4, the obscured representation of the text message from Sally that is presented in the embodiment of FIG. 5 still indicates that a text message has been received from Sally and generally indicates the time at which the text message was received and the length of the text message, but obscures the message itself and, therefore, preserves the confidentiality of the message, such as by blurring the message.

Figure 6:
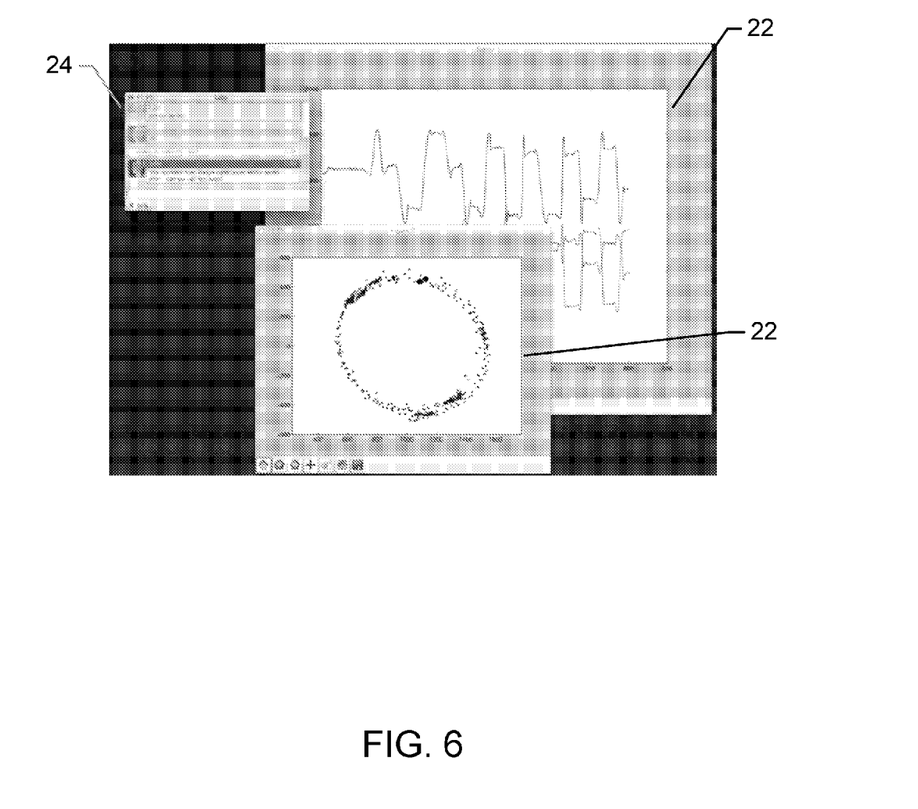
FIG. 6 is an illustration of an obscured representation of some information and an unobscured representation of other information on a non-private display in accordance with a further embodiment of the present invention.

In yet another embodiment depicted in FIG. 6, the obscured representation of the private information may be presented in a manner that a user viewing the non-private display 12 would appreciate that a text message has been received, but the obscured representation may blur or otherwise obscure not only the message itself as described above in conjunction with the embodiment of the non-private display of FIG. 5, but also the identification of the person from whom the text message was received as well as the time at which the text message was received. While several examples of an obscured representation of the private information have been provided, the apparatus 30, such as the processor 32, the communication interface 36, the user interface 38 or the like, may cause the presentation of other types of obscured representations of the private information in other embodiments. For example, the obscured representation of the private information may consist of the presentation of information that is different than the private information, thereby providing the appearance of a conventional display so as not to alert others of the obscuration. Still further, the obscured representation of the private information may include the removal of all or at least a portion of the private information from the non-private display or the prevention of all or at least a portion of the private information from being presented upon the non-private display, even though the private information continues to be registered to appear upon the non-private display.

As shown in block 48 of FIG. 3, the apparatus 30, such as the processor 32, the user interface 38, the communication interface 36 or the like, may also cause the presentation of the information on the private pass-through display 14 concurrent with the presentation of the obscured representation of the information on the non-private display 12. In this regard, the same information may be the subject of the presentations on both the non-private display 12 and the private pass-through display 14. However, the manner in which that same information is presented is different for the non-private display 12 and the private pass-through display 14. In this regard, the presentation of the information by the private pass-through display 14 may cause the information to be presented in an unobscured manner such that the user may readily view the information in contrast to the obscured representation of the same information that is presented by the non-private display 12. As such, the user may view and, if appropriate, react to the information that is presented upon the private pass-through display 14 even though others in the vicinity of the non-private display 12 are unable to make sense of the obscured representation of the same information that is presented upon the non-private display.

Figure 7:
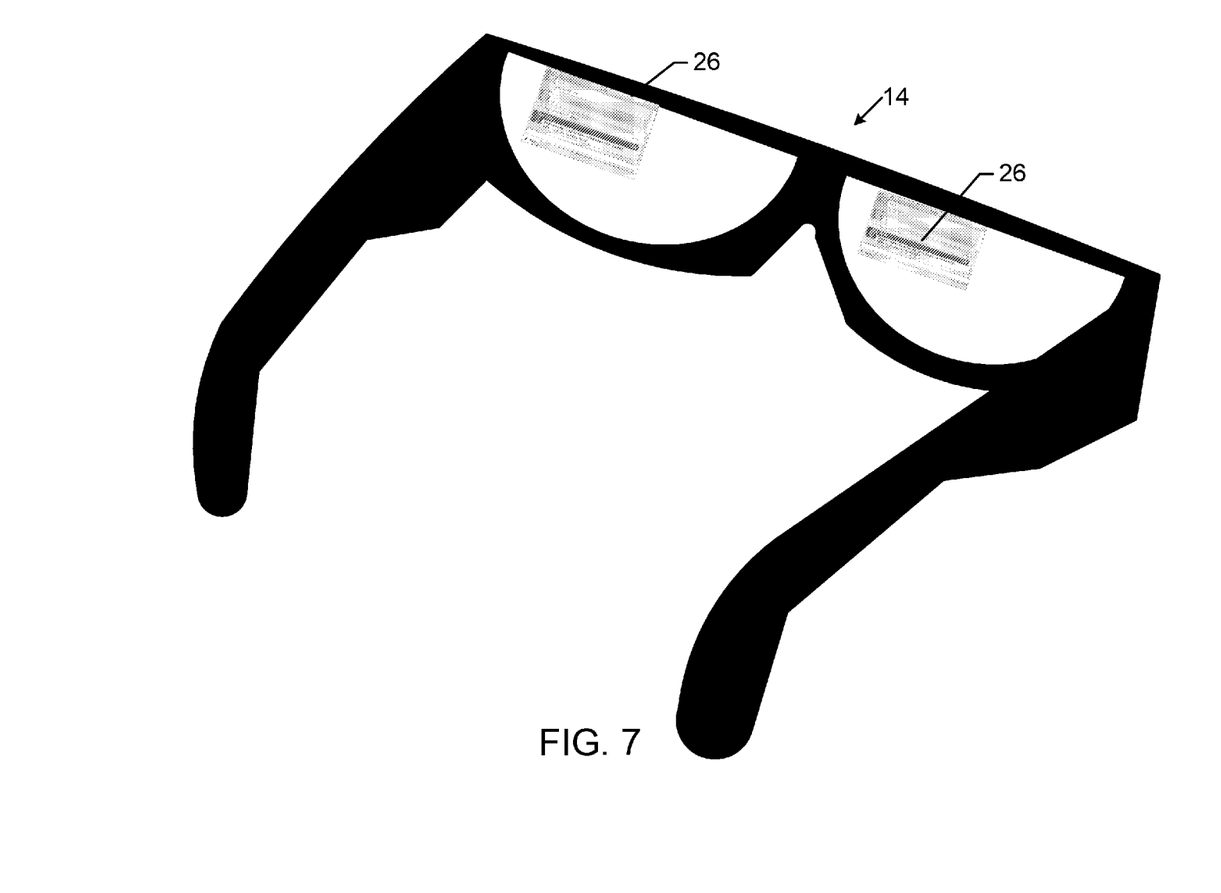
FIG. 7 is a perspective view of the private pass-through display of FIG. 1 that may be specifically configured in accordance with an example embodiment of the present invention.

In one embodiment, the presentation of the information on the private pass-through display 14 is such that the information is positioned on the private pass-through display such that the information obscures a view by the user of the obscured representation of the same information on the non-private display 12. In this regard, a user viewing the private pass-through display 14 will view the presentation of the information, such as the private information, at a location that appears to be superimposed upon or otherwise overlie the obscured representation of the same information on the non-private display 12. Thus, a user who is looking through the private pass-through display 14 may view the information, such as the private information that is presented upon the private pass-through display as well as the other information that is presented by the non-private display 12. However, the user of a private pass-through display 14 of one embodiment may not view the obscured representation of the same information that is presented by the non-private display 12 since the presentation of that same information by the private pass-through display is superimposed upon, overlies or otherwise blocks the user's vision of the obscured representation of that same information by the non-private display. In the embodiment of FIG. 1 and as shown in FIG. 7, an unobscured representation of the information may be presented in window 26 of the private pass-through display 14. Relative to the user's gaze, window 26 of the private pass-through display 14 may be positioned so as to overlie or otherwise be superimposed upon the corresponding window 24 of the non-private display 12 within which the obscured representation of the same information is presented.

In order to permit the user to view the other portions of the non-private display 12, such as the other portions of the non-private display that are unobscured, the private pass-through display 14 of one embodiment may not block, at least not entirely, the user's vision of the other portions of the non-private display. In other words, the private pass-through display 14 may be configured so as not to obscure or otherwise limit the user's view of the other windows 22 presented by the non-private display 12 that include non-private or public information.

The apparatus 30, such as the processor 32 or the like, may position the information on the private pass-through display 14 so as to obscure the view of the user of the obscured representation of the same information on the non-private display 12 in various manners. In one manner, the apparatus 30, such as the processor 32, the sensor 39 or the like, may be configured to determine the user's gaze, such as by tracking the position of the user's head, the user's eyes or the like. Additionally, a fiducial marker, such as a registration mark, may be associated with the non-private display 12 to permit the private pass-through display 14 and the non-private display to be aligned. As noted above, the fiducial marker may be provided by the obscured representation of the information on the non-private display 12. Alternatively, the fiducial marker may be presented on another portion of the non-private display 12, such as in one or more corners of the non-private display. Further, the fiducial marker may by physically associated with the non-private display 12, such as by being taped or otherwise attached to the non-private display. Still further, the fiducial marker may be defined by the content and the positioning of the content upon the non-private display 12 and/or the non-private display itself, such as the physical dimensions of the non-private display, may serve as the fiducial marker.

Based upon the tracking of the user's gaze, the position of the obscured representation of the information on the non-private display 12 and the positional relationship between the non-private display 12 and the private pass-through display 14 as at least partially defined by the fiducial marker, the apparatus 30, such as the processor 32, the user interface 38, the communication interface 36 or the like, may be configured to position the information as presented by the private pass-through display 14 in such a manner as to block the user's view of the obscured representation of the same information on the non-private display.

As shown in blocks 44 and 46 and as described above, the apparatus 30 may therefore include means, such as the processor 32, the user interface 38, the communication interface 36 or the like, for causing presentation of an obscured representation of the information on the non-private display 12 and also means, such as the processor 32, the user interface 38, the communication interface 36 or the like, for causing presentation of the information on the private pass-through display 14 concurrent with the presentation of the obscured representation of the information on the non-private display. In this regard, the apparatus 30 of one embodiment may include means, such as the processor 32, the user interface 38, the communication interface 36 or the like, for positioning information on the private pass-through display 14 such that the information obscures a view by the user of the obscured representation of the same information on the non-private display 12.

As described, a method, apparatus 30 and computer program product are therefore provided in order to present different types of information, such as private information and public information, in a manner that preserves the confidentiality of the private information. In this regard, the method, apparatus and computer program product may present different representations of the same information, such as private information, on the non-private display 12 and on the private pass-through display 14. Thus, the method, apparatus 30 and computer program product may preserve the confidentiality of the information by obscuring the representation of the information on the non-private display 12, while permitting the user to view an unobscured representation of the information on the private pass-through display 14. In addition to the obscured representation of the information, the method, apparatus 30 and computer program product of an example embodiment may provide for the presentation of other information, such as public information, in an unobscured manner on the non-private display 14, thereby allowing a user to share this other information, such as public information, with others while avoiding disclosure of the private information.

As described above, FIG. 3 illustrates a flowchart of an apparatus 30, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 34 of an apparatus 30 employing an embodiment of the present invention and executed by a processor 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

That which is claimed:

1. A method comprising:
determining, with a processor, that at least a portion of information to be displayed is private;
causing presentation of an obscured representation of the private portion of the information on a non-private display concurrent with presentation of an unobscured representation of a non-private portion of the information on the non-private display; and
causing presentation of an unobscured representation of the private portion of the information on a wearable display device having a private pass-through display, wherein causing presentation of the unobscured representation of the private portion of the information on the private pass-through display comprises aligning the private pass-through display and the non-private display for overlay of the unobscured representation of the private portion of the information upon the obscured representation of the private portion of the information on the non-private display such that the user having the wearable display device views, via the private pass-through display, the unobscured representation of the private portion of the information concurrent with the presentation of the unobscured representation of the non-private portion of the information on the non-private display.

2. The method of claim 1 wherein causing presentation of the information on the private pass-through display further comprises positioning the private portion of the information on the private pass-through display based upon a fiducial marker associated with the non-private display such that the presentation of the private portion of the information on the private pass-through display overlies the obscured representation of the private portion of the information on the non-private display.

3. The method of claim 2 wherein causing presentation of an obscured representation of the information on the non-private display further comprises causing presentation of the fiducial marker that serves as the obscured representation of the private portion of the information and that is utilized to position the private portion of the information on the private pass-through display.

4. The method of claim 1 wherein causing presentation of the obscured representation of the private portion of the information on the non-private display further comprises causing presentation of an unobscured representation of the non-private portion of the information and concurrently causing presentation of the obscured representation of the private portion of the information.

5. The method of claim 1 wherein causing presentation of the obscured representation of the private portion of the information on the non-private display further comprises causing presentation of the obscured representation of both the private portion and the non-private portion of the information.

6. The method of claim 1 wherein causing presentation of the obscured representation of the private portion of the information on the non-private display further comprises causing presentation of different information on the non-private display instead of the information determined to be private.

7. An apparatus comprising at least one processor and at least one memory including computer program instructions, the at least one memory and the computer program instructions configured to, with the at least one processor, cause the apparatus at least to:
determine that at least a portion of information to be displayed is private;
cause presentation of an obscured representation of the private portion of the information on a non-private display concurrent with presentation of an unobscured representation of a non-private portion of the information on the non-private display; and
cause presentation of an unobscured representation of the private portion of the information on a wearable display device having a private pass-through display, wherein causing presentation of the unobscured representation of the private portion of the information on the private pass-through display comprises aligning the private pass-through display and the non-private display for overlay of the unobscured representation of the private portion of the information upon the obscured representation of the private portion of the information on the non-private display such that the user having the wearable display device views, via the private pass-through display, the unobscured representation of the private portion of the information concurrent with the presentation of the unobscured representation of the non-private portion of the information on the non-private display.

8. The apparatus of claim 7 wherein the at least one memory and the computer program instructions are further configured to, with the at least one processor, cause the apparatus to cause presentation of the information on the private pass-through display by positioning the private portion of the information on the private pass-through display based upon a fiducial marker associated with the non-private display such that the presentation of the private portion of the information on the private pass-through display overlies the obscured representation of the private portion of the information on the non-private display.

9. The apparatus of claim 8 wherein the at least one memory and the computer program instructions are further configured to, with the at least one processor, cause the apparatus to cause presentation of an obscured representation of the private portion of the information on the non-private display by causing presentation of the fiducial marker that serves as the obscured representation of the private portion of the information and that is utilized to position the private portion of the information on the private pass-through display.

10. The apparatus of claim 7 wherein the at least one memory and the computer program instructions are further configured to, with the at least one processor, cause the apparatus to cause presentation of the obscured representation of the private portion of the information on the non-private display by causing presentation of an unobscured representation of the non-private portion of the information and concurrently causing presentation of the obscured representation of the private portion of the information.

11. The apparatus of claim 7 wherein the at least one memory and the computer program instructions are further configured to, with the at least one processor, cause the apparatus to cause presentation of the obscured representation of the private portion of the information on the non-private display by causing presentation of the obscured representation of both the private portion and the non-private portion of the information.

12. The apparatus of claim 7 wherein the at least one memory and the computer program instructions are further configured to, with the at least one processor, cause presentation of the obscured representation of the private portion of the information on the non-private display by causing presentation of different information on the non-private display instead of the information determined to be private.

13. The apparatus of claim 7 wherein the private pass-through display comprises a head-mounted or near-eye display.

14. The apparatus of claim 13 further comprising user interface circuitry arranged to facilitate user control of at least some functions of the apparatus.

15. A computer program product comprising at least one non-transitory computer-readable storage medium bearing computer program instructions embodied therein for use with a computer, the computer program instructions comprising instructions configured to:
   determine that at least a portion of information to be displayed is private;
   cause presentation of an obscured representation of the private portion of the information on a non-private display concurrent with presentation of an unobscured representation of a non-private portion of the information on the non-private display; and
   cause presentation of an unobscured representation of the private portion of the information on a wearable display device having a private pass-through display, wherein causing presentation of the unobscured representation of the private portion of the information on the private pass-through display comprises aligning the private pass-through display and the non-private display for overlay of the unobscured representation of the private portion of the information upon the obscured representation of the private portion of the information on the non-private display such that the user having the wearable display device views, via the private pass-through display, the unobscured representation of the private portion of the information concurrent with the presentation of the unobscured representation of the non-private portion of the information on the non-private display.

16. The computer program product of claim 15 wherein the computer program instructions further comprise instructions configured to cause presentation of the private portion of the information on the private pass-through display by positioning the private portion of the information on the private pass-through display based upon a fiducial marker associated with the non-private display such that the presentation of the private portion of the information on the private pass-through display overlies the obscured representation of the private portion of the information on the non-private display.

17. The computer program product of claim 16 wherein the instructions configured to cause presentation of an obscured representation of the private portion of the information on the non-private display further comprise instructions configured to cause presentation of the fiducial marker that serves as the obscured representation of the private portion of the information and that is utilized to position the private portion of the information on the private pass-through display.

18. The computer program product of claim 15 wherein the computer program instructions further comprise instructions configured to cause presentation of the obscured representation of the private portion of the information on the non-private display by causing presentation of an unobscured representation of a non-private portion of the information and concurrently causing presentation of the obscured representation of a private portion of the information.

19. The computer program product of claim 15 wherein the computer program instructions further comprise instructions configured to cause presentation of the obscured representation of the private portion of the information on the non-private display by causing presentation of the obscured representation of both the private portion and the non-private portion of the information.

20. The computer program product of claim 15 wherein the computer program instructions further comprise instructions configured to cause presentation of the obscured representation of the private portion of the information on the non-private display by causing presentation of different information on the non-private display instead of the information determined to be private.

* * * * *